UNITED STATES PATENT OFFICE.

JOSEPH J. HUGHES, OF NEW YORK, N. Y.

COMPOSITION FOR CLEANING STEAM-BOILERS.

SPECIFICATION forming part of Letters Patent No. 646,990, dated April 10, 1900.

Application filed October 28, 1899. Serial No. 735,092. (No specimens.)

*To all whom it may concern:*

Be it known that I, JOSEPH J. HUGHES, a citizen of the United States, and a resident of New York, in the county of New York and State of New York, have invented certain new and useful Solutions for Cleaning Steam-Boilers, of which the following is a specification.

My invention consists of a solution for cleaning steam-boiler tubes and pipes, the ingredients that will when thoroughly mixed perfectly clean and preserve the same.

My invention consists in mixing together—say for one gallon—two-thirds of a pound of white-oak and one-third of a pound of black-oak tanning-bark, six ounces of chemically-pure soda, four ounces slippery-elm bark, and one and one-eighth ounces of tincture of iron, mixed with sufficient amount of water to make the balance.

In preparing the solution all the above articles are placed in a tank, where they are thoroughly steamed and allowed to remain a number of hours before the liquid is drawn therefrom.

The materials to have the best possible strength should be soaked in water about three or four hours before the steam is turned on, which is permitted to flow three or four hours longer. By this time the materials have become thoroughly soaked and disintegrated, and by the steam passing through the whole mass it thoroughly mixes the same. The liquid is then drawn off into another tank, while the refuse is taken out of the first-mentioned tank preparatory to mixing another quantity, so that there will always be a reserve.

The solution if applied at the pump will cleanse not only the pipes that it passes through, but will remove also all scales from the boiler and flues, as well as other foreign substances, thus preventing the boiler from pitting and the iron from corroding.

I am aware that other preparations have been used, while the mixture as above described and injected into a boiler will thoroughly cleanse the same, it being understood that those familiar with the ingredients herein contained can revise the amounts named above and even substitute other ingredients of like nature that would virtually amount to the same solution without departing from the objects of this invention.

Having now described my invention, what I claim as new therein, and desire to secure by Letters Patent, is—

1. A composition for cleaning steam-boilers, consisting of tanbark, pure soda, slippery-elm bark and tincture of iron, all substantially as and for the purposes set forth.

2. A composition for cleaning steam-boilers, consisting of white and black tanbark, pure soda, slippery-elm bark and tincture of iron, all substantially as and for the purposes set forth.

Signed at New York city, in the county of New York and State of New York, this 25th day of October, A. D. 1899.

JOSEPH J. HUGHES.

Witnesses:
GEO. W. MCCORMICK,
J. B. MCGIRR.